July 5, 1932.  W. KNIPPELMEIR  1,865,920
ANIMAL TRAP
Filed June 27, 1931
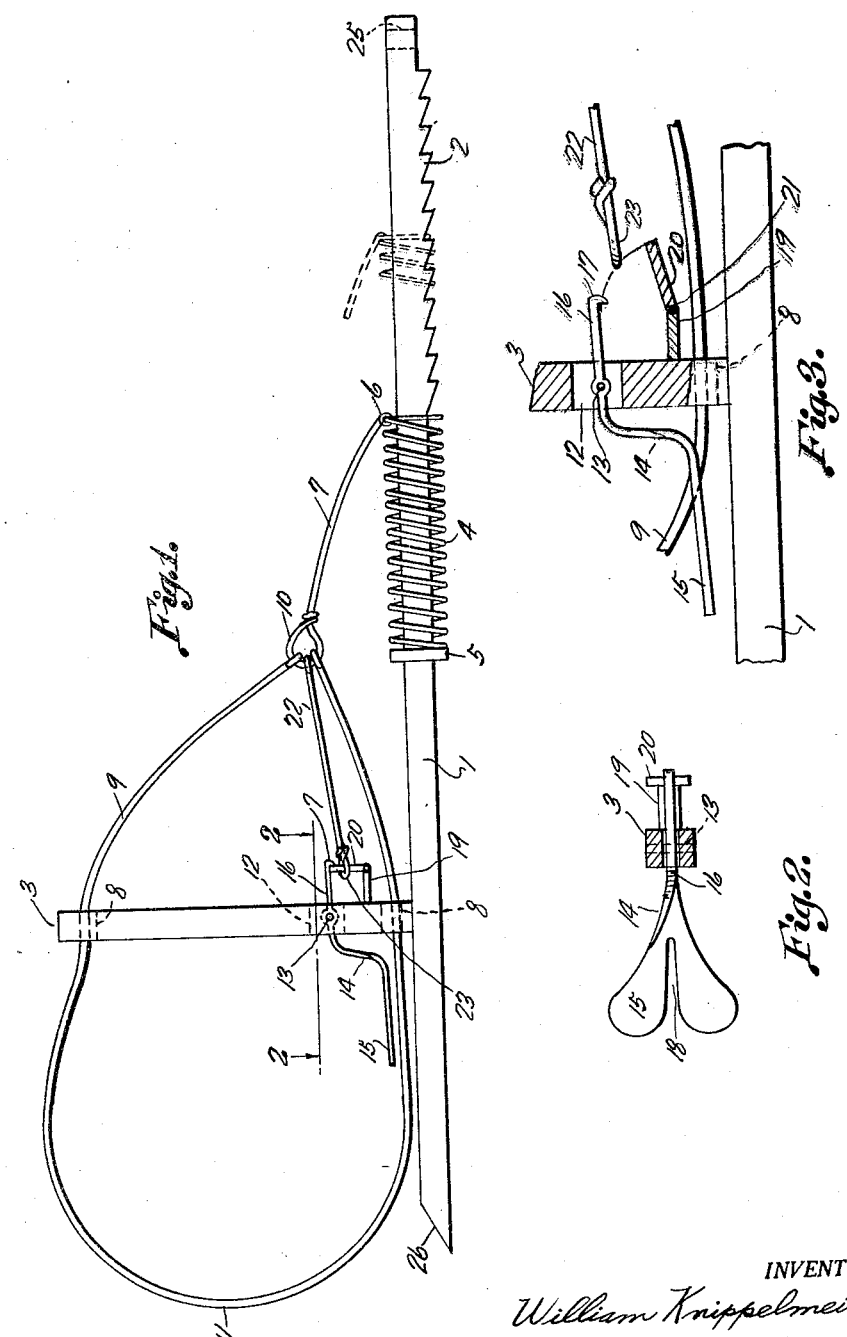
INVENTOR:
William Knippelmeir
BY Adam E. Fisher
ATTORNEY Patented July 5, 1932

1,865,920

UNITED STATES PATENT OFFICE

WILLIAM KNIPPELMEIR, OF MINCO, OKLAHOMA

ANIMAL TRAP

Application filed June 27, 1931. Serial No. 547,226.

This invention relates to animal traps.

The main object of the invention is to provide a simple, inexpensive and efficient trap in which the animal catching or holding element is in the form of a snare or loop adapted to draw tight around the animal when caught so as to instantly kill the animal and relieve the same of suffering.

A further object is to provide a trap of this character embodying a snare as aforesaid spring set to draw tight about the animal as it springs the trap and so arranged that the snare is then locked in the animal holding position to positively prevent the escape of the animal.

With these and other objects in view the invention resides in the novel construction and arrangement of parts as hereinafter set forth and claimed, reference being had to the accompanying drawing wherein:

Figure 1 is a side view of the trap in its set position.

Figure 2 is an enlarged section along the line 2—2 in Figure 1.

Figure 3 is an enlarged detail side view partially in section of a portion of the trap showing the trigger elements in their sprung position.

Referring now more particularly to the drawing the trap comprises a base 1 in the form of an elongated rod or bar having ratchet teeth 2 formed along its intended underside adjacent one end and having a vertically set post 3 adjacent but spaced from its opposite and hereinafter referred to as forward end. An expansion coil spring 4 is coiled around the base 1 and is braced at its inner end against a collar 5 secured on the base some distance inwardly of the ratchet teeth 2, the opposite end of the spring being straightened and coiled about one of the end convolutions at 6 and then bent upwardly and inwardly back over the remainder of the spring to form the arm 7. The spring 4 is considerably larger than the base 1 around which it is coiled so that it may expand outwardly and freely pass over the ratchet teeth 2, the particular purpose and advantage of this action being hereinafter set forth. Apertures 8 are provided through the post 3 near its upper and lower ends with their axes in line with the axis of the base 1. A snare 9 in the form of a cord, small chain, flexible wire or other suitable material is provided and the ends thereof are passed through the apertures 8 and are secured to an eye 10 formed at the end of the aforesaid arm 7. The arrangement is thus such that the normal tendency of the spring 4 to expand and more outwardly at its outer end will exert a pull upon the ends of the snare loop 9 and draw its bight 11 tight against the post 3.

A slot 12 is provided through the post 3 parallel with and above the lower aperture 8 and a pivot pin 13 is passed through the post and laterally through this slot. The trigger 14 comprises a bifurcated treadle or pan 15 and the upwardly and outwardly bent arm 16 provided at its end with a hook 17. The arm 16 of the trigger is passed through the slot 12 and is pivoted on the pivot pin 13, the treadle or pan 15 being thus disposed forwardly of the post 3 and dependend down adjacent the base 1. As aforesaid the treadle 15 is bifurcated and a slot 18 is thus provided into which the lower portion of the snare 9 may enter as it is drawn taut as best shown in Figure 3. An arm 19 is extended from the post 3 beneath the end of the trigger arm 16 and a latch 20 is pivotally or hingedly connected at its lower end at 21 to the lower end of this arm 19. A latch rod 22 is attached by one end to the eye 10 and has a loop or eye 23 formed at its free end.

In use the trap is first set by compressing the spring 4 and pulling the bight 11 of the snare 9 forward as shown. The latch 20 is then swung upward, the loop or eye 23 on the latch rod 22 is slipped over the latch and the hook 17 on the trigger arm 16 is dropped or hooked over the upper end of the latch by first slightly depressing the treadle 15 and then raising it. The spring 4 is thus held against expansion and the trap is set and is disposed in a runway or other position likely to lie in the path of the animal desired to be caught, the bight 11 of the snare 9 being distended so that the animal may pass freely therethrough as will be understood. The animal as it passes will then step upon the treadle 15 depressing the same and swinging the hook 17 out of engagement with the latch 20. The latch 20 thus swings back and down and the latch rod 22 is released allowing the spring 4 to expand and draw the snare tight about the animal. The spring 4 as it expands passes over the ratchet teeth 2 and as the snare 9 draws tight about the animal the arm 7 acts to pull the outer end of the spring slightly upward pulling one or more of the end convolutions of the spring into engagement with the ratchet teeth as shown in Figure 1 in dotted lines. The snare 9 is thus locked tight about the animal and any struggles thereof, should they slightly loosen the snare, will result in the snare being locked in successively tighter positions as will be apparent. An aperture 25 is provided in the base 1 through which a wire, peg, or chain may be passed to hold the trap upright or to hold it against displacement and for similar reasons the other or forward end of the base is pointed as at 26 so that it may be forced into the earth or other object.

From the foregoing it will be evident that I have provided a simple, and efficient trap which may be constructed for use in catching practically any animal and which is humane in its operation.

While I have herein set forth a certain preferred embodiment of my invention it is understood that I may vary from the same in minor structural details so as best to construct a practical device for the purposes intended, not departing from the spirit of the invention and within the scope of the appended claims.

I claim:

1. In a device of the kind described, a base, ratchet teeth formed along one end portion of the base, a post secured on the base, the said post having apertures near its ends, an expansion coil spring loosely mounted on the base and braced at one end inwardly of the ratchet teeth, an inwardly bent arm on the outer end of the spring, an eye formed on the inner end of the said arm, a snare passed through the apertures in the said post and connected at its ends to the said eye on the arm, and trigger means for releasably holding the spring in a compressed position, the said trigger means comprising a trigger pivoted on the post and hooked at one end, a latch pivotally attached to the post and adapted to be engaged by the hooked end of the trigger, and a latch rod secured to the said eye on the arm and looped at its end for engagement with the said latch.

2. In a device of the kind described, a base, ratchet teeth on the base, an expansion coil spring operatively mounted on the base and adapted to engage the ratchet teeth as it expands, a post secured to the base, the said post having apertures, a snare passed through the said apertures and secured at its ends to the said spring, and trigger means for releasably holding the spring in a compressed position.

In testimony whereof I affix my signature.

WILLIAM KNIPPELMEIR.